United States Patent [19]

Lineback

[11] Patent Number: 4,877,190
[45] Date of Patent: Oct. 31, 1989

[54] SANDBLASTED GARBAGE DISPOSAL SYSTEM AND METHOD OF USING

[75] Inventor: Cecil Lineback, Indian Head, Md.

[73] Assignee: Waste Management Systems, Inc., Bethesda, Md.

[21] Appl. No.: 293,353

[22] Filed: Jan. 4, 1989

[51] Int. Cl.$^4$ ............................................. B02C 19/06
[52] U.S. Cl. ........................................ 241/5; 241/23; 241/24; 241/39; 241/41; 241/65; 241/80; 241/97
[58] Field of Search .................... 241/5, 23, 24, 39, 41, 241/65, 80, 97, DIG. 38

[56] References Cited

U.S. PATENT DOCUMENTS 4,283,015  8/1981  Smith ....................................... 241/5
4,538,764  9/1985  Dunbar .................................... 241/5

FOREIGN PATENT DOCUMENTS 2396826  3/1979  France ........................ 241/DIG. 38

Primary Examiner—Timothy V. Eley
Attorney, Agent, or Firm—Fleit, Jacobson, Cohn, Price, Holman & Stern

[57] ABSTRACT

A system for collecting, drying, and comminuting garbage. The garbage is collected and introduced into a hopper. A plurality of heat lamps and sandblasting nozzles are provided on the walls of the hopper. The garbage is dried and comminuted in the hopper. A mesh conveyor is provided for filtering out particles smaller than sand which are delivered by a conveyor for further waste disposal. Particles and sand which do not pass through the mesh conveyor are fed back and delivered under pressure to the sandblasting nozzles.

6 Claims, 3 Drawing Sheets

SANDBLASTED GARBAGE DISPOSAL SYSTEM AND METHOD OF USING

FIELD OF THE INVENTION

The present invention relates to a system for comminuting garbage for facilitating waste disposal.

BACKGROUND OF THE INVENTION

The problem of the increasing amount of garbage produced in this country each year haunts each city and community when addressing the problem of waste disposal. Cities are running out of places to dump waste, or otherwise finding the costs of landfills prohibitively expensive. Certainly, many small communities protest the development of landfills in their area. Also, even if land can be located for developing landfills, ground water contamination has been a continuous problem with such a resolution.

In their search for alternatives to landfills, many cities construct large incinerators for burning garbage. However, this alternative is very expensive and pollutes the air with the emission of dangerous toxic gases and toxic organic chemical residue from the ash of the incinerator. Typically, substances such as arsenic, cadmium, chromium, diogenes and forays are the byproducts of the garbage incinerator which present the most serious health risks.

U.S. Pat. No. 3,506,414 to Skendrovic discloses an apparatus which receives waste and comminutes the waste by a rotary separator-disintegrator having serrations on an inner wall thereof. A rotating slinger which is driven by a motor which causes the garbage inside the disintegrator to be thrown outward against the serrated inner wall for cutting down the garbage into smaller pieces.

While the Skendrovic device teaches an apparatus for reducing garbage into smaller pieces for subsequent waste disposal, the apparatus can perform only limited comminution. Generally, it is desired to reduce the garbage or refuse into minute particles for permitting convenient waste disposal.

SUMMARY OF THE INVENTION

The waste comminution system of the present invention comprises a hopper defined by four side walls surrounding a predetermined volume between top and bottom open ends. A plurality of heat lamps are provided on each of the side walls. In addition, a plurality of sandblasting nozzles are provided on each of the four side walls and connected to a compressor unit for delivering sand under pressure to each nozzle for projecting the sand into the predetermined volume.

As garbage is introduced into the hopper from the top open end, the heat lamps are activated and sand is projected at high speeds into the volume through the sandblasting nozzles for breaking down the garbage into small particles. A conveyor unit is provided at the bottom open end of the hopper. The conveyor unit includes a mesh conveyor belt having pores sized so as to permit only particles smaller than sand to pass therethrough. Consequently, as the garbage is reduced to particles smaller than sand, those particles pass through the mesh conveyor and out the bottom open end of the hopper. Below the bottom open end of the hopper, a main conveyor is provided having a solid conveyor belt for conveying the garbage particles which pass through the mesh conveyor to a remote disposal facility.

In addition, a recycle system is provided whereby a receiving trough is provided at one end of the mesh conveyor for collecting sand and other particles which do not pass through the mesh conveyor belt. These particles are fed out of the hopper to an external compressor unit which delivers the particles and sand back to the hopper and redistributes the material under pressure to each of the sandblasting nozzles on the four side walls. By this arrangement, the combination of sand and garbage particles are used to further comminute garbage within the hopper.

It is a primary object of the present invention to provide a system for comminuting domestic garbage into particles smaller than sand.

It is another object of the present invention to provide a system for comminuting garbage into particles smaller than sand and whereby in the process of comminuting, the small partcles of garbage above a certain sieve size are combined with sand and fed back for sandblasting additional larger pieces of garbage, with the end result being the reduction of garbage to particles of a size smaller than sand.

The above and other objects and advantages will become more readily apparent when reference is made to the following description taken in conjunction with the accompanying drawings.

DETAILED DESCRIPTION OF THE PREFERRED EMBODIMENTS

Figure 1:
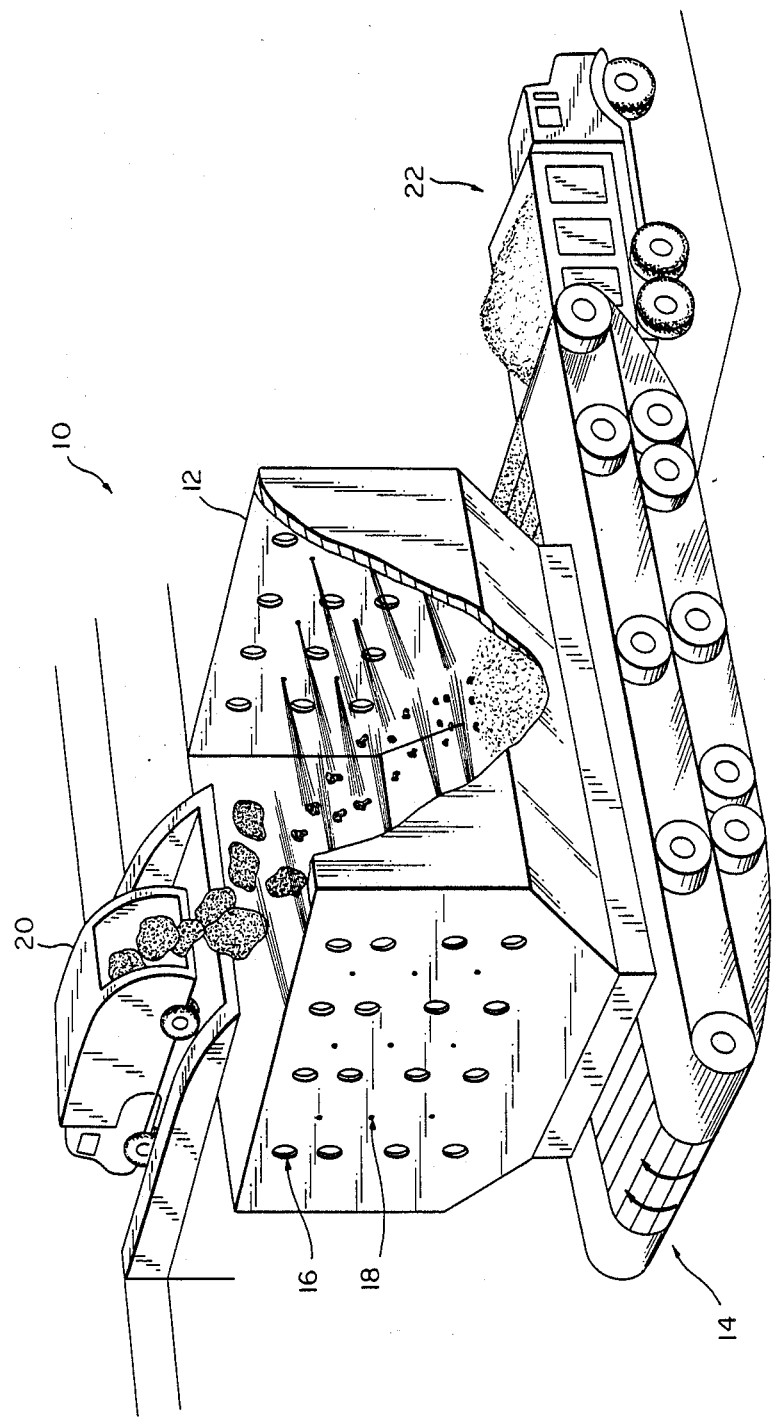
FIG. 1 is a diagram illustrating the garbage comminuting and disposal system of the present invention.

Referring first to FIG. 1, the garbage comminuting and disposal system of the present invention is generally shown at 10. The garbage comminuting system 10 comprises a garbage comminuting hopper 12 and a main conveyor unit 14 positioned below the hopper 12. A plurality of heat lamps 16 and sandblasting nozzles 18 are provided on the walls of the hopper 12. The power cords for the lamps and sand feed lines to the nozzles from a sand source have been omitted for the sake of clarity.

Generally, trash is introduced from above into the hopper 12 from a garbage truck 20, or other means such as a conveyor (not specifically shown). Some of the water content of the garbage is removed by gravity and falls through the hopper. The garbage introduced into the hopper 12 is comminuted by the sand shot into the hopper at high speed to comminute the garbage into fine particles. The resulting small particles are carried by gravity from the hopper 12 to the main conveyor 14, located below the hopper, to a garbage disposal truck 22 for delivering the garbage particles of a very fine size to a disposal facility.

Figure 2:
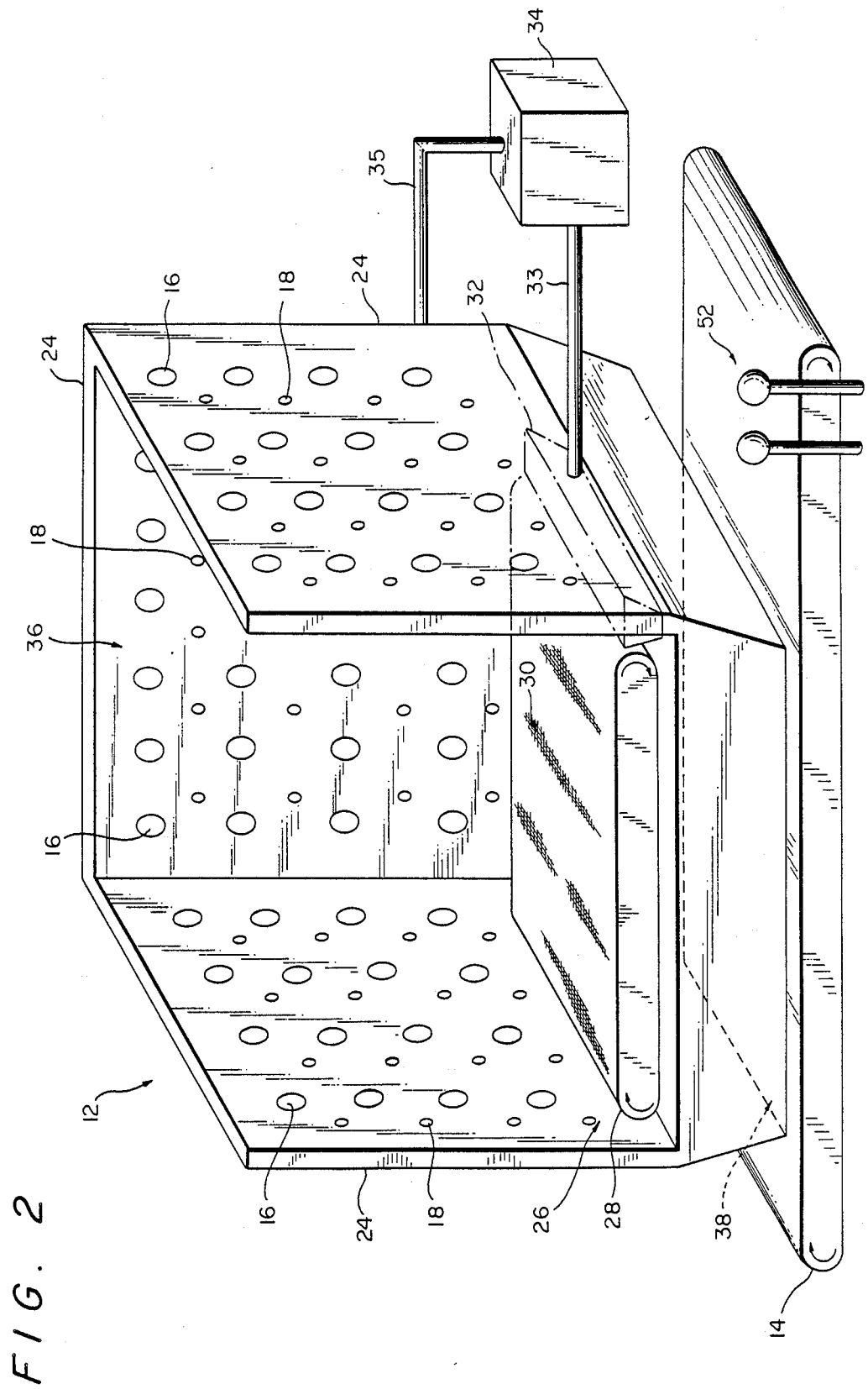
FIG. 2 is a perspective, partial sectional view illustrating the garbage comminuting hopper including the sandblasting and water removal features in accordance with the present invention.

FIG. 2 illustrates the garbage comminuting hopper 12 in more detail. The hopper 12 comprises four side walls 24 (the front side wall being omitted in this figure for illustrative purposes). As illustrated, the heat lamps 16 are provided along the side walls 24 in a predetermined number and pattern according to the capacity of the hopper 12. The sandblasting nozzles 18 are provided on all four side walls of the hopper 12 beginning approximately 6 inches from the base of the hopper 12 to within 6 feet of the top of the hopper 12. Typically, the sandblasting nozzles 18 are located on 12 inch diagonals both horizontally and vertically from each other. A source of sand (not shown) provides sand to the nozzles.

Proximate the bottom of the hopper 12, a conveyor unit 26 is provided comprising a mesh conveyor belt 28. The mesh conveyor belt 28 includes openings 30 sized so as to permit particles smaller than sand to pass therethrough.

A collector trough 32 is provided at one end of the conveyor unit 26 for collecting sand and other particles which do not pass through the mesh conveyor belt 28. Material collected in the trough 32 is fed to an external compressor unit 34 by pipe 33 which delivers the sand and other particles back to the hopper through pipe 35 by redistributing the material to each of the sandblasting nozzles 18 by a network of pipes (not shown). The recycled sand and particles sized equal to or greater than sand are introduced to the nozzles with sand from the sand source.

Figure 3:
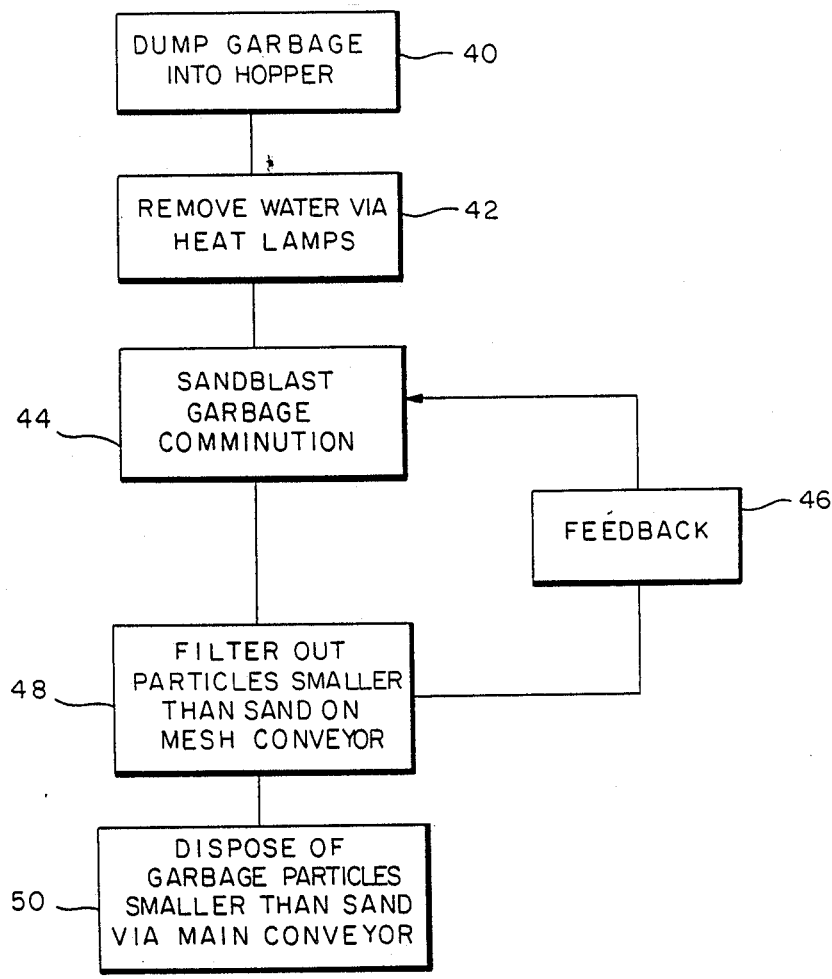
FIG. 3 is a block diagram illustrating the operational steps of the garbage comminuting and disposal system of the present invention.

Referring now to FIGS. 2 and 3, the operation of the garbage comminuting and disposal system 10 will now be described. Garbage is introduced into the hopper 12 via the top open end 36 at step 40. The heat lamps 16 are then activated and, by their intense heat, remove water from the garbage by evaporation at step 42. Meanwhile, the compressor unit 34 delivers sand to be projected out from the sandblasting nozzles 18 into the hopper for comminuting the garbage, at step 44. Eventually, the garbage will be reduced to particles approximately the same size as sand. The sand and other garbage particles of a size greater than sand do not pass through the mesh conveyor 28, but are collected in the trough 30 and fed back to be projected out of the sandblasting nozzles 18, as shown in step 46. However, the garbage particles will eventually be reduced to particles smaller than sand, and pass through the mesh conveyor belt 28, as shown in step 48. The garbage particles which pass through the mesh conveyor belt 28 fall through the open bottom end 38 of the hopper 12, and onto the main conveyor 14 at step 50. The garbage particles on the main conveyor 14 are conveyed to a remote garbage truck or other disposal facility. For further removing any water still present in the garbage particles on the conveyor 14, additional heat lamps 52 are provided at one end of the conveyor 14 prior to delivering the garbage particles to a remote disposal facility. Alternately, the fine particles may be magnetically screened to remove all metal particles from the residue for recycling prior to transporting the particles to a disposal facility.

It is envisioned that the garbage comminuting system 10 of the present invention can reduce 30 gallons of bulk garbage to no more than 1 pint of residue. As a result, the original volume of the garbage is reduced to at least 1/240 of the volume of the garbage delivered to the system 10. Typically, this will increase the life of a 10-year landfill to over 30 to 40 more years of useful life.

Figure 4:
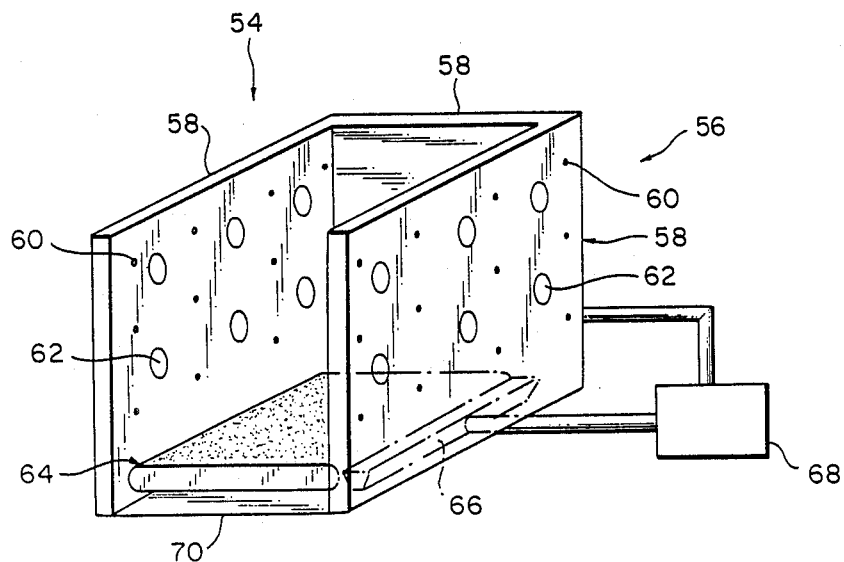
FIG. 4 is a perspective view of an alternative embodiment of the present invention and illustrating a garbage comminuting system for domestic or home use.

FIG. 4 illustrates a garbage comminuting system 54 for home or domestic use. System 54 comprises the same features as the commercial comminuting system 10 on a smaller scale. Typically, a drum 56 is provided having four side walls 58 with sandblasting nozzles 60 and heat lamps 62. A conveyor unit 64 is provided similar to the conveyor unit 26 illustrated in FIG. 2. The conveyor unit 64 includes a mesh conveyor belt for filtering out particles smaller than sand while delivering larger particles to the collector trough 66 which is connected to an external compressor unit 68 for feeding the sandblasting nozzles 60, similar to that described in conjunction with FIG. 2.

The operation of the home comminuting system 54 is similar to that of the commercial system 10. However, it is envisioned that the bottom end 70 of the hopper 56 is closed for receiving the comminuted garbage particles. These particles are removed periodically by a sliding tray (not shown) or other similar device placed on the bottom end 70 of the hopper 56.

The above description is intended by way of example only and is not intended to limited the present invention in any way except as set forth in the following claims.

I claim:

1. A process for comminuting large pieces of garage, said process comprising the steps of:
   introducing large pieces of garbage into a container;
   applying heat from heat lamps for removing water from said garbage;
   sandblasting said garbage for reducing said garbage to particles of a size smaller than sand;
   separating particles smaller than sand; and
   disposing of said particles smaller than sand.

2. The process of claim 1, further comprising the steps of:
   collecting sand and other particles of a size greater than sand; and
   feeding back said sand and other particles of a size greater than sand for futher sandblasting of said garbage.

3. A system for comminuting garbage comprising:
   a hopper defined by walls surrounding a predetermined volume, said hopper having an open receiving end for receiving garbage and an open delivery end;
   a plurality of heat lamps being disposed on said walls of said hopper for removing water in said garbage;
   a plurality of sandblasting nozzles being disposed on each of said walls for comminuting said garbage;
   a compressor unit for delivering sand under pressure to each of said plurality of sandblasting nozzles;
   a conveyor unit being disposed within said hopper proximate said garbage delivery end, said conveyor unit including a mesh conveyor belt having a plurality of pores sized so as to permit particles smaller than sand to pass therethrough; and
   a main conveyor unit placed below said garbage delivery end and including a conveyor belt for conveying said particles which pass through said mesh conveyor belt to a remote disposal facility.

4. The system of claim 3, further comprising a collector trough located at one end of said mesh conveyor belt for receiving particles of a size greater than said pores of said mesh conveyor belt, said collector trough being connected to said compressor unit for forming a recycle feedback path of said sand and other particles which are of a size greater than said pores of said mesh conveyor belt.

5. The system of claim 3, further comprising a plurality of addtional heat lamps disposed proximate said main conveyor unit for removing water from said particles on said main conveyor belt.

6. The system of claim 1, wherein said compressor unit is external to said hopper.

* * * * *